W. E. PASIK.
ELECTRIC HEATER.
APPLICATION FILED JAN. 19, 1920.
1,386,356.
Patented Aug. 2, 1921.
2 SHEETS—SHEET 1.
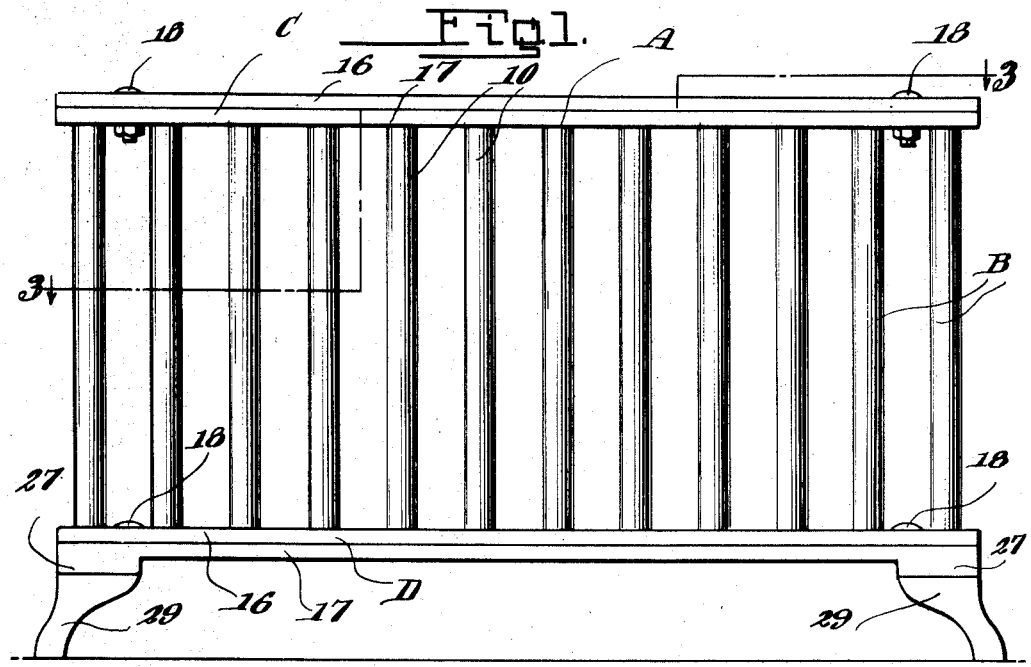
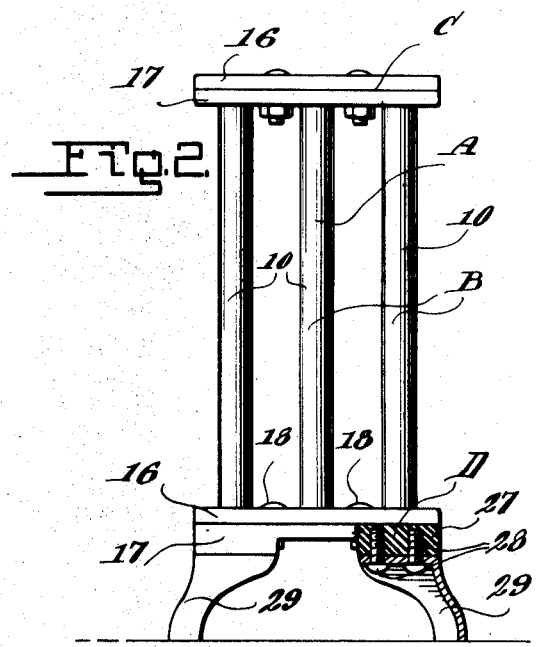
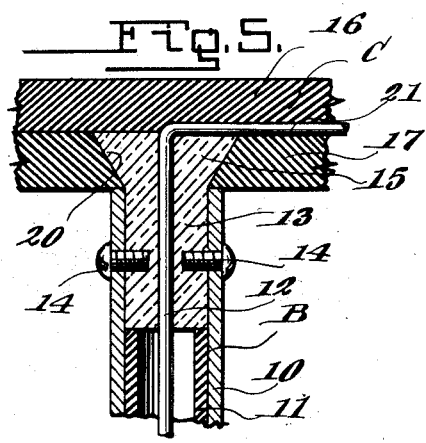
Inventor
William E. Pasik

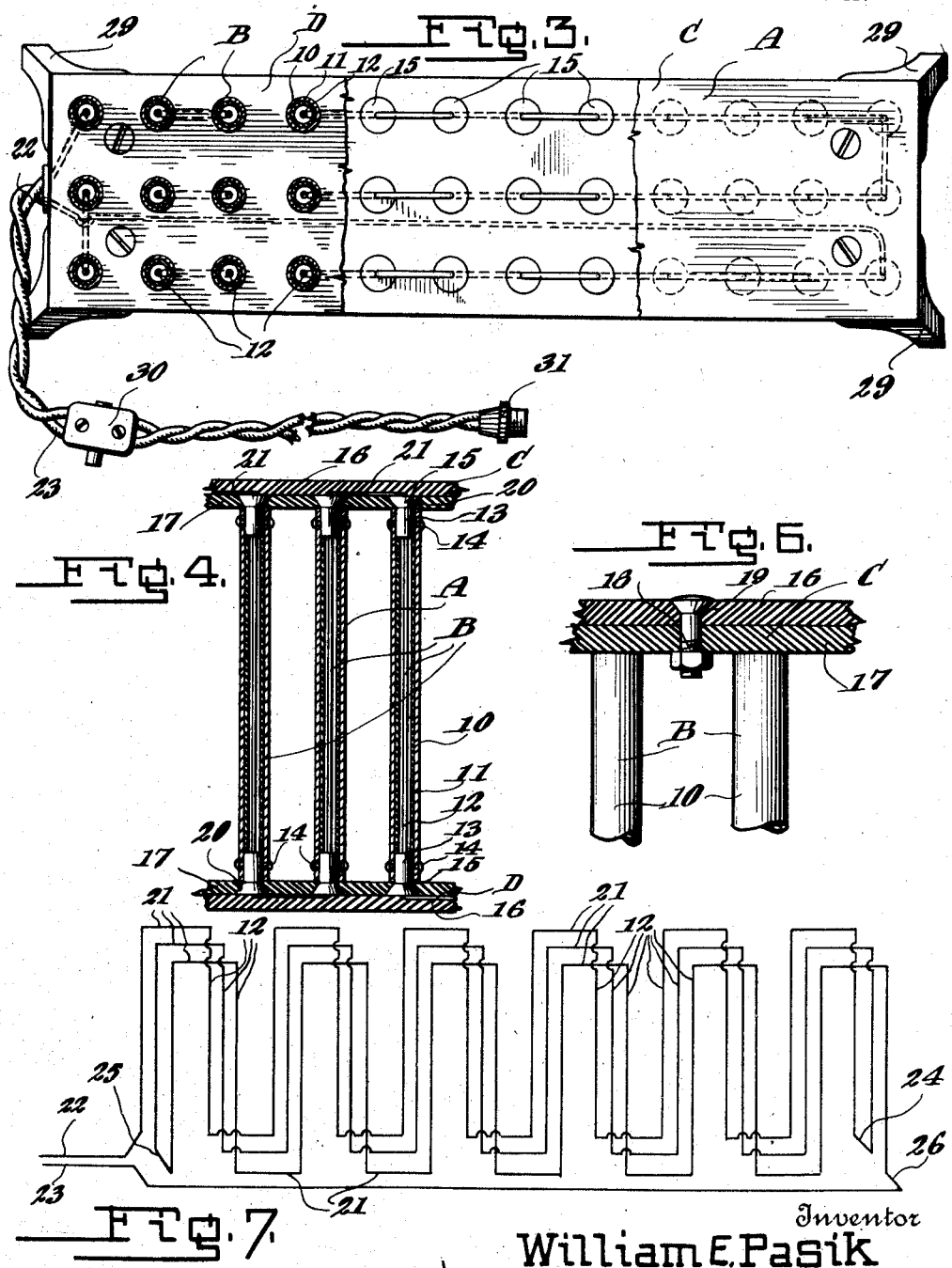

UNITED STATES PATENT OFFICE.

WILLIAM E. PASIK, OF DE KALB, ILLINOIS.

ELECTRIC HEATER.

1,386,356.  Specification of Letters Patent.  Patented Aug. 2, 1921.

Application filed January 19, 1920. Serial No. 352,470.

*To all whom it may concern:*

Be it known that I, WILLIAM E. PASIK, a citizen of the United States, residing at De Kalb, in the county of De Kalb and State of Illinois, have invented certain new and useful Improvements in Electric Heaters, of which the following is a specification.

This invention relates to electric heaters, and the primary object of the invention is to provide an improved electric heater of the radiator type in which a maximum amount of heat radiating surface is provided, so as to permit the quick and thorough heating of a room or the like.

Another object of the invention is to provide an improved electric heater embodying a plurality of heat radiating units arranged in spaced relation so that the air can circulate around and between the same and thereby effect the quick heating of the surrounding atmosphere.

A further object of the invention is to provide an improved electric heater having a plurality of spaced heating elements each including a resistance wire positioned in a hollow heat radiating member having a large area of radiating surface for warming the surrounding air.

A further object of the invention is to provide an electric heater of pleasing appearance which can be easily transported from one room to another and which is adapted to be connected to the ordinary electric light socket.

A still further object of the invention is to provide an improved electric heater of the above character, which is durable and efficient in use, and one that is simple and easy to manufacture, and one that can be placed upon the market at a reasonable cost.

Other objects of the invention will appear in the following detailed description, taken in connection with the drawings, forming a part of this specification, in which drawings:

Figure 1 is a side elevation of the electric heater.

Fig. 2 is an end elevation of the same partly in section.

Fig. 3 is a longitudinal section through the same, taken on the line 3—3 of Fig. 1.

Fig. 4 is a fragmentary vertical transverse section through the heater.

Fig. 5 is an enlarged fragmentary detail vertical section through one of the heating units illustrating the means of connecting the same to the connecting plate.

Fig. 6 is a fragmentary vertical section illustrating the means of fastening the connecting plates together, and Fig. 7 is a diagrammatic view of the electric wire for the heater.

Referring to the drawings in detail, wherein similar reference characters designate corresponding parts throughout the several views, the letter A indicates the improved electric heater which includes the heating units B and the upper and lower connecting members C and D.

The heat units B are arranged in spaced longitudinally extending rows, and each includes a hollow pipe formed of iron or the like, which can be, if so desired, provided with a rough or corrugated outer surface, to increase the heat radiating area thereof. The hollow pipe 10 receives an inner sleeve 11, such as asbestos which forms means for effectively insulating the electric resistance wire 12, which is arranged centrally in the sleeve for the pipe 10. The high resistance wire 12 is spaced from the sleeve 11 and when current is passed through the same, the air surrounding the wire becomes heated and heats the pipe 10. The terminals of the pipe 10 receive porcelain plugs 13, which are held against displacement by suitable screws or the like 14 which extend through the pipe into the plug.

The outer terminals of the plugs 13 are provided with outwardly flared heads 15, which serve as means to connect the pipes 10 with the upper and lower connecting members C and D.

The upper and lower connecting members C and D are constructed identically the same and each include an outer plate 16 and an inner plate 17. The plates 16 and 17 of the upper and lower connecting members C and D are formed substantially rectangular in shape and are connected together by suitable nuts and bolts 18, the heads of which are countersunk as at 19. Each of the inner plates is provided with tapered opening 20 for the reception of the flared heads 15 of the porcelain plugs 13 and in assembling the device the resistance wire 12 is first placed in one of the plugs 13, which is provided with a slit for the reception of the same, and the flared head of the plug is placed in the tapered opening 20 in the inner plate 17 formed for the reception of the same. The pipe 10 is then slipped over the plug and the other plug of the unit is placed in the opening in one of the plates 17 and pushed into the pipe 10. The plugs are then held in place by the screws 14. After all of the heating units are placed in position on the inner plates 17, the outer plates 16 are placed in position and held against displacement by the bolts 18. The outer plates 16 prevent displacement of the porcelain plugs 13 from the inner plates 17. As stated, the plates 16 and 17 are formed of insulating material and the connecting portions 21 for the heating units 12 are positioned between the plates.

As clearly shown in Fig. 7 of the drawings, the lead wires 22 and 23 extend into the lower connecting section C and the lead wire 22 is connected to one row of the heating units which is connected to the intermediate rows as at 24, the forward end of which is connected in turn to the outer row as at 25. The lead wire 23 is then connected as at 26 to the rear end of the outer row. Thus it will be seen that all of the heating units are connected together in series. The outer plug 17 of the lower connecting section D is provided at its corners with enlarged bases 27, which have secured thereto by suitable screws or the like 28, iron feet 29 which form supports for the radiator.

The lead wires 22 and 23 have interposed therein a suitable push switch 30 so that the heater can be turned on or off without disconnecting the plug 31, which is of the ordinary or any preferred type from the electric socket (not shown).

From the foregoing description it can be seen that an improved electric heater is provided of exceptionally durable and simple construction which has a relatively large area of heat rediating surface, so that the surrounding atmosphere can be efficiently and readily heated.

Changes in details may be made without departing from the spirit or scope of my invention; but,

I claim:

1. In an electric heater, a hollow cylindrical metallic body, a sleeve of non-electric conducting material arranged in the body, and a longitudinal electric resistance wire arranged in the sleeve in spaced relation to the inner surface thereof.

2. In an electric heater, a hollow cylindrical iron body, a sleeve of insulative material arranged in the body, solid porcelain plugs carried by the terminals of the body engaging the sleeve, and an electric resistance wire carried by the plugs and arranged in the body in spaced relation to the sleeve.

3. An electric heater comprising upper and lower sections, heat radiating units arranged between the sections, each of the sections including inner and outer plates, the inner plates having oppositely extending tapered sockets formed therein, each of the heat radiating units including a hollow body, porcelain plugs carried by the terminals of the body, flared heads formed on the plugs and extending beyond the body and arranged to fit in the tapered sockets, resistance wires carried by the plugs and arranged in the body, the outer plates of the sections being adapted to overlie the sockets and engage the enlarged flared portion of the porcelain plugs and means for securing the outer plates to the inner plates.

4. An electric heater comprising upper and lower sections, heat radiating units arranged between the sections, each of the sections including inner and outer plates, the inner plates having oppositely extending tapered sockets formed therein, each of the heat radiating units including a hollow cylindrical pipe, a sleeve of insulating material arranged in the pipe, porcelain plugs carried by the terminals of the pipes, flared heads formed on the plugs and arranged to fit in the tapered sockets, the resistance wires carried by the plugs and arranged in the body in spaced relation to the insulated sleeve, means connecting the resistance wires arranged intermediate the inner and outer plates of the sections whereby displacement of the wires is prevented, the outer plates of the sections being adapted to overlie the sockets and arranged to engage the outer surface of the enlarged flared faces of the porcelain plugs, to prevent displacement thereof from the sockets, and means for detachably securing the outer plates to the inner plates.

WILLIAM E. PASIK.